US005222084A

United States Patent [19]
Takahashi

[11] Patent Number: 5,222,084
[45] Date of Patent: Jun. 22, 1993

[54] ECHO CANCELER HAVING ADAPTIVE DIGITAL FILTER UNIT ASSOCIATED WITH DELTA-SIGMA MODULATION CIRCUIT

[75] Inventor: Yutaka Takahashi, Tokyo, Japan
[73] Assignee: NEC Corporation, Tokyo, Japan
[21] Appl. No.: 720,321
[22] Filed: Jun. 25, 1991
[30] Foreign Application Priority Data
Jun. 25, 1990 [JP] Japan .................. 2-165909
[51] Int. Cl.$^5$ .............. H04J 15/00; H04L 5/14; H04M 1/00; H04M 9/08
[52] U.S. Cl. .................. 370/32.1; 370/32; 370/29; 379/406; 379/410; 381/93; 381/94
[58] Field of Search .............. 370/32.1, 29, 32; 379/411, 410, 406, 408; 381/93, 94; 375/12, 14

[56] References Cited
U.S. PATENT DOCUMENTS

| 4,582,963 | 4/1986 | Danstrom | 379/411 |
| 4,742,510 | 5/1988 | Quatieri | 379/410 |
| 4,746,902 | 5/1988 | Tol et al. | 370/32.1 |
| 4,827,472 | 5/1989 | Ferrieu | 370/32.1 |
| 4,972,436 | 9/1990 | Halim et al. | 370/32.1 |
| 4,987,569 | 1/1991 | Ling et al. | 370/32.1 |
| 5,029,167 | 7/1991 | Arnon et al. | 370/32.1 |

OTHER PUBLICATIONS

FIR Digital Filters for High Sample Rate Applications, Tewksbury et al. IEEE Communication Magazine, Jul. 1987.

Primary Examiner—Douglas W. Olms
Assistant Examiner—Chau T. Nguyen
Attorney, Agent, or Firm—Sughrue, Mion, Zinn, Macpeak & Seas

[57] ABSTRACT

An echo canceler comprises an adaptive digital filter circuit for producing an echo replica signal on the basis of a transmit digital signal and a first digital signal indicative of a far-end signal, and an adder for eliminating the echo signal from a received signal with reference to the echo replica signal, wherein the echo replica signal is modulated by a delta-sigma modulation circuit and, thereafter, converted into an analog signal for allowing the adder to operate on the echo replica signal and the received signal both in an analog form so that the adder with a narrow dynamic range can be available.

10 Claims, 13 Drawing Sheets

ECHO CANCELER HAVING ADAPTIVE DIGITAL FILTER UNIT ASSOCIATED WITH DELTA-SIGMA MODULATION CIRCUIT

FIELD OF THE INVENTION

This invention relates to a transceiver for a two-wire digital transmission system, more particularly, to an echo canceler equipped with adaptive digital filter unit.

DESCRIPTION OF THE RELATED ART

An echo canceler carries out echo cancellation on a digital input signal converted through an analog-to-digital conversion by using an echo replica signal produced by an adaptive digital filter unit. Typical examples of the echo cancelers are disclosed in "An ANSI Standard ISDN Transceiver Chip Set", ISSCC '89 Technical Digest, pages 256 and 257; in "An ISDN Echo-Canceling Transceiver Chip for 2B1Q Coded U-Interface", ISSCC '89 Technical Digest, pages 258 and 259; and in "2B1Q Transceiver for the ISDN Subscriber Loop", ISSCC '89 Technical Digest, pages 260 and 261, respectively.

FIG. 1 shows a prior art transceiver with an echo canceler incorporated in a two-wire digital transmission system, and the echo canceler aims at elimination of echo. Referring to FIG. 1, the prior art transceiver largely comprises a signal transmission section TM and an echo canceler EC. In the signal transmission section TM, a delay circuit 1 retards a transmit digital data signal TD, and a digital-to-analog converting circuit 2 converts the transmit digital signal TD to an analog data signal. A low pass filter circuit 3 eliminates high-frequency components from the analog data signal, and the analog data signal is, then, supplied to a line driving circuit 4. The line driving circuit 4 is coupled through a resistive element 5 to a transformer 6, and a two-wire signal path L1 and L2 are further coupled to the transformer 6. Thus, data information is transferred from the transmit digital data signal TD to the analog data signal, and the line driving circuit 4 allows the two-wire signal path L1 and L2 to propagate the data information in cooperation with the transformer 6.

The line driving circuit 4 is further coupled through a resistive element 7 to a balancing network 8, and the transformer 6 and the balancing network 8 are coupled in parallel to two input nodes of an adder 9. If Equation 1 is satisfied, a perfect balancing is achieved, and the adder 9 relays only a received far-end signal to a low pass filter circuit 10.

$$R4/Zb = R3/Z1 \qquad \text{Equation 1}$$

R3 and R4 are resistances of the resistive elements 5 and 7, Zb is the impedance of the balancing network 8, and Z1 is the impedance of the two-wire signal path L1 and L2 and the transformer 6. In the prior art transceiver, the resistive elements 5 and 6, the balancing network 8 and the adder 9 form a hybrid integrated circuit HB.

However, the two-wire signal path L1 and L2 is a distributed constant circuit, and the balancing network is a concentrated constant circuit. Therefore, the perfect balancing is hardly achieved, and the balancing network 8 can not perfectly prevent a received signal RD from an echo due to the data signal indicative of the data information. This is the reason why the echo canceler EC is incorporated in the transceiver. Assuming now that the maximum loss on the two-wire signal path L1 and L2 is 50 dB and that the balancing network 8 decreases the echo by 20 dB, the echo canceler is expected to decrease the echo by 50 dB if targeting the signal/echo ratio for 20 dB.

The echo canceler EC incorporated in the prior art transceiver behaves as follows. The output signal of the adder 9 contains the far-end signal as well as the echo, and high frequency components outside the band are eliminated from the output signal of the adder 9 by means of a low pass filter circuit 10. The output signal of the low pass filter circuit 10 is converted to a digital signal through an analog-to-digital converting circuit 11, and the analog-to-digital converting circuit 11 is usually of the over-sampling type, because a strict linearity is expected. The digital signal thus produced is fed to a digital low pass filter circuit 12, and quantize noises are eliminated from the digital signal. The digital low pass filter circuit 12 further achieves a decimation from the over-sampling frequency to a baud-rate frequency, and the baud-rate frequency is equal to the frequency of the transmit signal. The output signal of the digital low pass filter circuit 12 is supplied to one of the input ports of an adder 13. The transmit digital data signal TD was supplied to an adaptive digital filter circuit 14, and an echo replica signal at the baud-rate is produced by the adaptive digital filter circuit 14. The echo replica signal is fed to the other input port of the adder 13, and the echo signal is eliminated from the output signal of the digital low pass filter circuit 12. In other words, the output signal of the adder 13 contains the far-end signal only. Upon completion of training, a switching circuit 15 is changed from the output of the adder 13 to the output of an equalizer 14 as will be described hereinbelow. The equalizer 14 eliminates the transmission distortion from the output signal or the far-end signal, and produces the received signal RD.

The adaptive digital filter circuit 14 is hereinbelow described in detail with reference to FIG. 2. The adaptive digital filter circuit 14 has two input ports IN1 and IN2 and an output port OUT. The transmit digital data signal TD is supplied to the input port IN1, and the other input port IN2 is selectively coupled through the switching circuit 15 to the output of the adder 13 and the output of the equalizer 14. While the adaptive digital filter circuit carries out the training operation, the switching circuit 15 allows the output signal of the adder 13 to reach the other input port IN2. However, if the training operation is completed, the switching circuit 15 supplies the far-end signal or the received signal RD to the other output port IN2.

A series combination of delay units each labeled with "T" is coupled to the input port IN1, and each of the delay units introduces a time delay equivalent to a single period of the baud rate into propagation of the transmit digital data signal TD. A plurality of multipliers each labeled with "X" are provided in association with the delay units. The leftmost multiplier multiplies a signal at the input port IN2 by alpha which is a coefficient for controlling a training speed, and the other multipliers respectively multiply the transmit digital data signal TD and the delay signals sequentially delayed by the product of the leftmost multiplier. Alpha is usually much smaller than 1, i.e. alpha << 1. The products thus produced by the multipliers are respectively supplied to a plurality of integrators each labeled with "I", and a plurality of multipliers each labeled with "X" multiply the integrals by the transmit signal and the delay signals thereof, respectively. The products thus produced by the second stage of the multipliers are added to one another by an adder labeled with "+". Each series combination of the delay unit, the first-stage multiplier, the integrator and the second-stage multiplier forms a tap.

Assuming now that the signal at the input port IN2 does not contain the far-end signal, an error signal of the echo canceler is fed to the input port IN2. The taps calculate a correlation between the transmit digital data signal and error signal, and integrate at the integrators. As a result, the integrators accumulate the waveform of echo signal sampled at the baud rate, and the waveform of the echo is fed from the taps to the adder in synchronism with the transmit digital data signal. The adder adds the waveforms fed from the taps and produces the echo replica signal. Even if the signal at the input port IN2 contains the far-end signal, the circuit behavior of the adaptive digital filter circuit is similar to the above described sequence, because no correlation is found between the transmit digital data signal and the far-end signal.

As described hereinbefore, the high precision analog-to-digital converting circuit 11 is the indispensable component of the prior art echo canceler, because the characteristics of the prior art echo canceler is dependent upon the linearity of the analog-to-digital converting circuit 11. This results in a large circuit arrangement of the transceiver. Since the adder 9 is located at the previous stage of the analog-to-digital converting circuit 11, the sum of the echo signal and the far-end signal is supplied to the high-precision analog-to-digital converting circuit 11, and the digital signal tends to be constituted by a long bit string. This means that the adder 13 needs a wide dynamic range for adding the echo replica signal to the output signal of the digital low pass filter circuit 12, and the adder 13 with a wide dynamic range makes the circuit arrangement of the transceiver large in size.

If the echo replica signal is converted into an analog signal and the analog echo replica signal is shaped by a low pass filter circuit, the echo signal may be deleted from the analog output signal of the adder 9 through a subtraction of the analog replica signal prior to the digital-to-analog conversion. However, this approach also needs a high precision analog-to-digital converting circuit with a strict linearity as well as a high performance low pass filter circuit, and is less feasible.

SUMMARY OF THE INVENTION

It is therefore an important object of the present invention to provide an echo canceler which is smaller in circuit arrangement than the prior art echo canceler.

To accomplish the object, the present invention proposes to apply a delta-sigma modulation technique to an echo replica signal.

In accordance with the present invention, there is provided an echo canceler associated with a signal transmission unit for transmitting a transmit digital signal and operative to eliminate an echo signal from a received analog signal containing at least the echo signal and a far-end signal, comprising: a) an adaptive digital filter circuit supplied with the transmit digital signal and a first digital signal without the echo signal so as to see a correlation therebetween, and operative to produce a digital echo replica signal; b) a delta-sigma modulation circuit operative to carry out a delta-sigma modulation on the digital echo replica signal and producing a second digital signal representative of the digital echo replica signal; c) a digital-to-analog converting circuit for converting the second digital signal to a first analog signal; d) a first adder supplied with the received analog signal and the first analog signal, and operative to eliminate the echo signal from the received analog signal for producing a received analog signal without the echo signal; and e) means operative to carry out a delta-sigma analog-to-digital converting operation on the received analog signal without the echo signal, and producing the first digital signal.

BRIEF DESCRIPTION OF THE DRAWINGS

The features and advantages of the echo canceler according to the present invention will be more clearly understood from the following description taken in conjunction with the accompanying drawings in which.

DESCRIPTION OF THE PREFERRED EMBODIMENTS

First Embodiment

Figure 1:
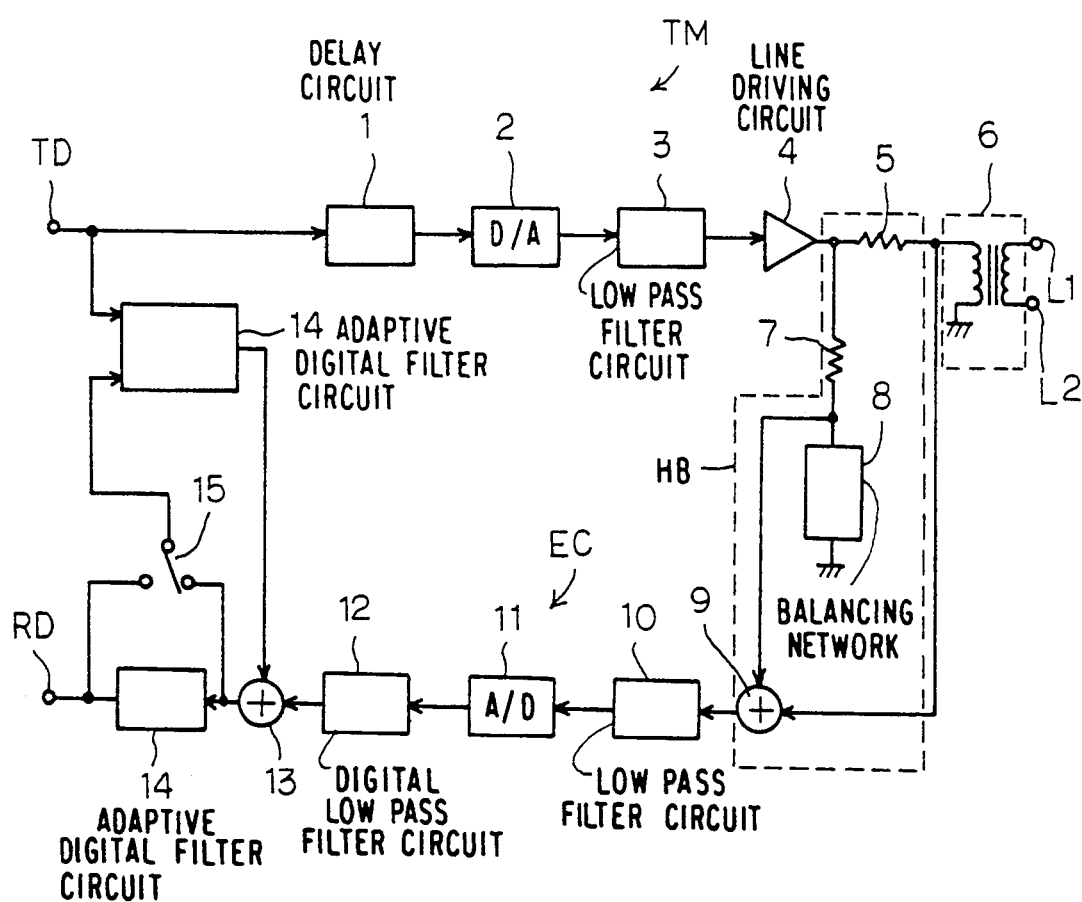
FIG. 1 is a block diagram showing the circuit arrangement of the prior art transceiver.
Figure 2:
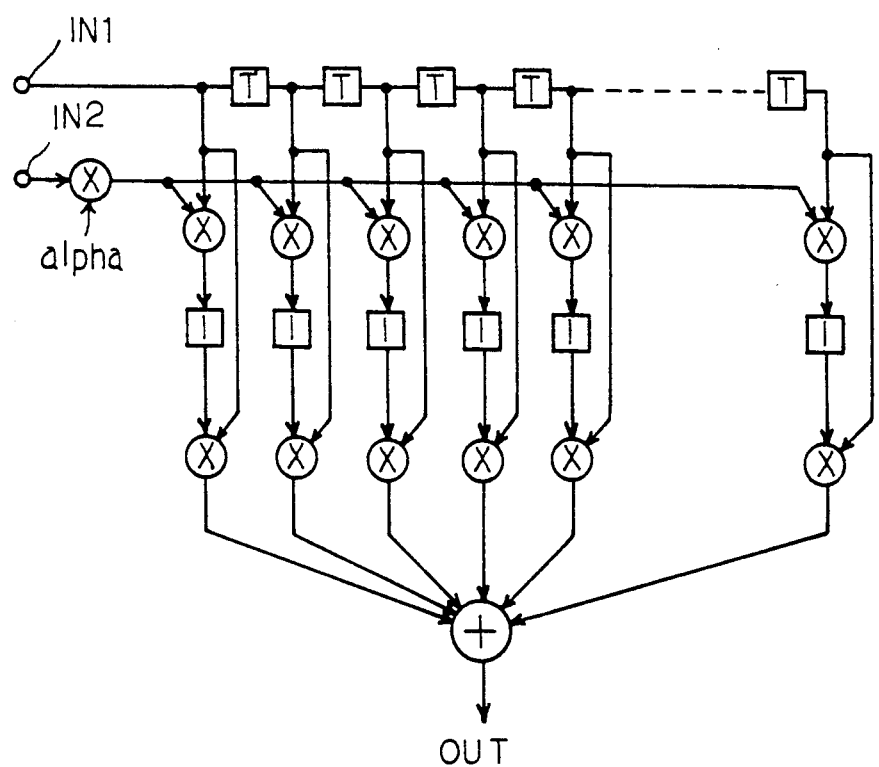
FIG. 2 is a block diagram showing the circuit arrangement of an adaptive digital filter circuit incorporated in the prior art transceiver.
Figure 3:
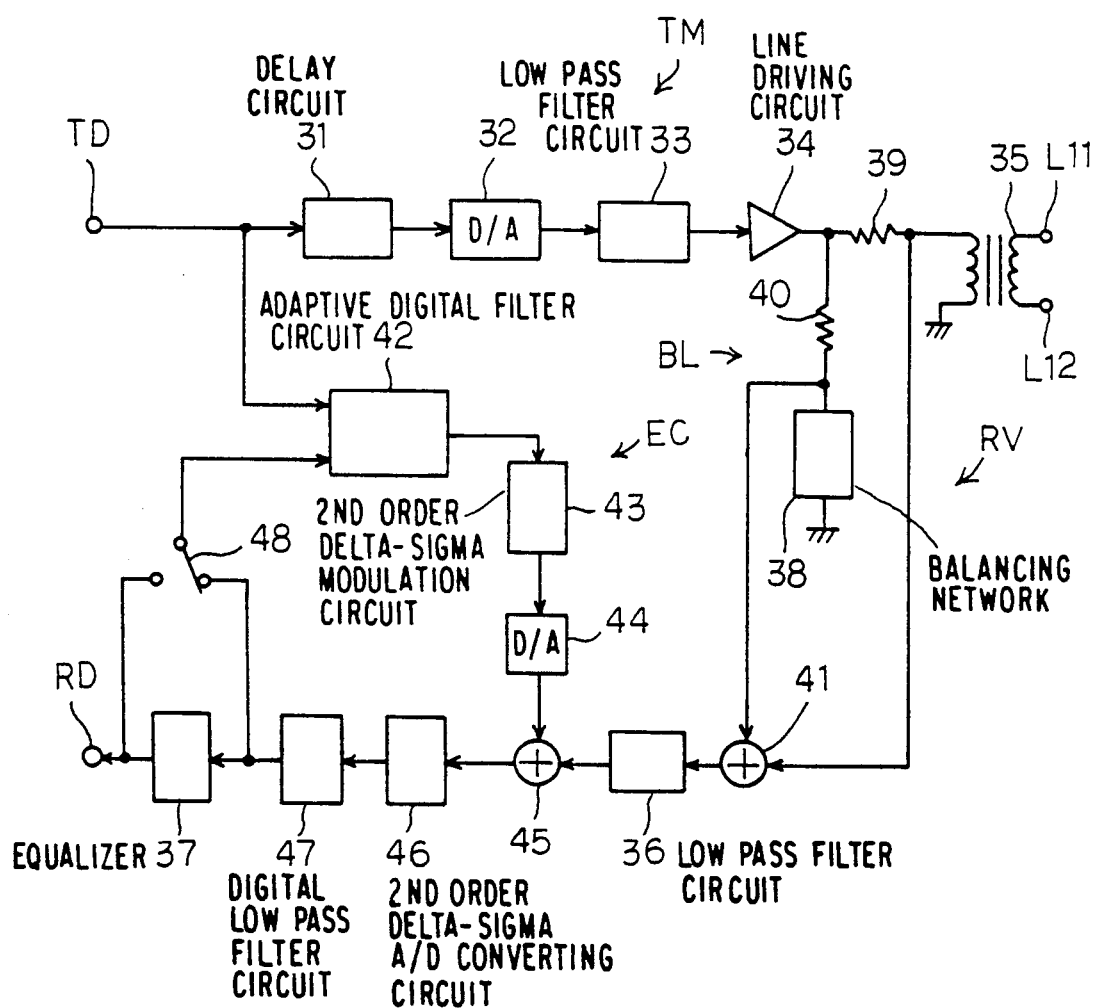
FIG. 3 is a block diagram showing the circuit arrangement of a transceiver equipped with an echo canceler according to the present invention.

Referring to FIG. 3 of the drawings, a transceiver according to the present invention largely comprises a signal transmission section TM, and a signal receiving section RV. The signal transmission section TM is similar in circuit arrangement to that of the prior art transceiver, and comprises a delay circuit 31, a digital-toanalog converting circuit 32, a low pass filter circuit 33 and a line driving circuit 34. A transformer is shared between the signal transmission section TM and the signal receiving section RV, and is coupled to a two-wire data signal path L11 and L12. A transmit digital data signal TD indicative of data information is supplied to the delay circuit 31, and the signal transmission section TM drives the transformer 35 for producing an analog data signal carrying the data information. Then, the two-wire data signal path L1 and L2 propagates the analog data signal to a destination as similar to the signal transmission section TM of the prior art transceiver.

The signal receiving section RV largely comprises a balancing circuit BL, an echo canceler EC, a low pass filter circuit 36 coupled between the balancing circuit BL and the echo canceler EC, and an equalizer 37 coupled to the echo canceler EC. The balancing circuit BL comprises a balancing network 38, a resistive element 39 coupled between the line driving circuit 34 and the transformer 35, a resistive element 40 coupled between the line driving circuit 34 and the balancing network 38, and an adder 41. However, the balancing circuit BL, the low pass filter circuit 36 and the equalizer 37 are similar to those of the prior art transceiver, and no further description is incorporated hereinbelow.

The echo canceler EC comprises an adaptive digital filter circuit 42 supplied with the transmit digital data signal TD, a second order delta-sigma modulation circuit 43 coupled to the output port of the adaptive digital filter circuit 42, a digital-to-analog converting circuit 44 coupled to the second order delta-sigma modulation circuit 43, an adder 45 coupled to the digital-to-analog converting circuit 44 and the low pass filter circuit 36, a second order delta-sigma analog-to-digital converting circuit 46 coupled to the adder 45, a digital low pass filter circuit 47 coupled to the second order delta-sigma analog-to-digital converting circuit 46, and a switching circuit 48 for selectively coupling the digital low pass filter circuit 47 and the equalizer 37 to the adaptive digital filter circuit 42. The adaptive digital filter circuit 47 and the digital low pass filter circuit 46 respectively correspond to the adaptive digital filter circuit 14 and the digital low pas filter circuit 12, and achieve the similar tasks, respectively.

The adaptive digital filter circuit 42 produces an echo replica signal at the baud rate frequency, and the echo replica signal is supplied to the second order delta-sigma modulation circuit 43. The echo replica signal is sampled at an over-sampling frequency n times larger than the baud rate frequency where n is an integer, and is, thereafter, modulated in a second order delta-sigma modulating manner. The second order delta-sigma modulation circuit 43 produces a single bit digital signal at the over-sampling frequency, and the digital-to-analog converting circuit 44 converts the single bit digital signal to an analog signal indicative of either binary number. In this instance, the single bit digital signal and the first analog signal serve as a second digital signal and a first analog signal, respectively. The single bit digital signal and, accordingly, the analog signal converted therefrom are representative of the echo replica signal. On the other hand, the output signal of the balancing circuit BL is fed from the adder 41 to the low pass filter circuit 36, and high frequency components outside of the band is eliminated from the output signal of the balancing circuit BL. The low pass filter circuit 36 supplies the output signal to the adder 45, and the output signal contains a far-end signal and an echo signal. The adder 45 carries out an adding operation on the analog signal representative of the echo replica signal and the output signal containing the far-end signal and the echo signal, and the echo signal is eliminated from the output signal. The output signal indicative of the calculation result is supplied from the adder 45 to the second order delta-sigma analog-to-digital converting circuit 46, and the second order delta-sigma analog-to-digital converting circuit 46 produces a single bit digital signal which serves as a third digital signal. The single bit digital signal is fed to the digital low pass filter 47, and the digital low pass filter circuit 47 eliminates high frequency quantize noise therefrom as well as decimates from the over-sampling frequency to the baud rate frequency. While the adaptive digital filter circuit 42 is in the training, the output signal of the digital low pass filter circuit 47 returns to the adaptive digital filter circuit 42. The output signal of the digital low pass filter circuit 47 does not contain the echo signal, and serves as a first digital signal. The output signal of the digital low pass filter circuit 47 is further fed to the equalizer 37 so that distortion is eliminated for producing a received signal RD.

Figure 4:
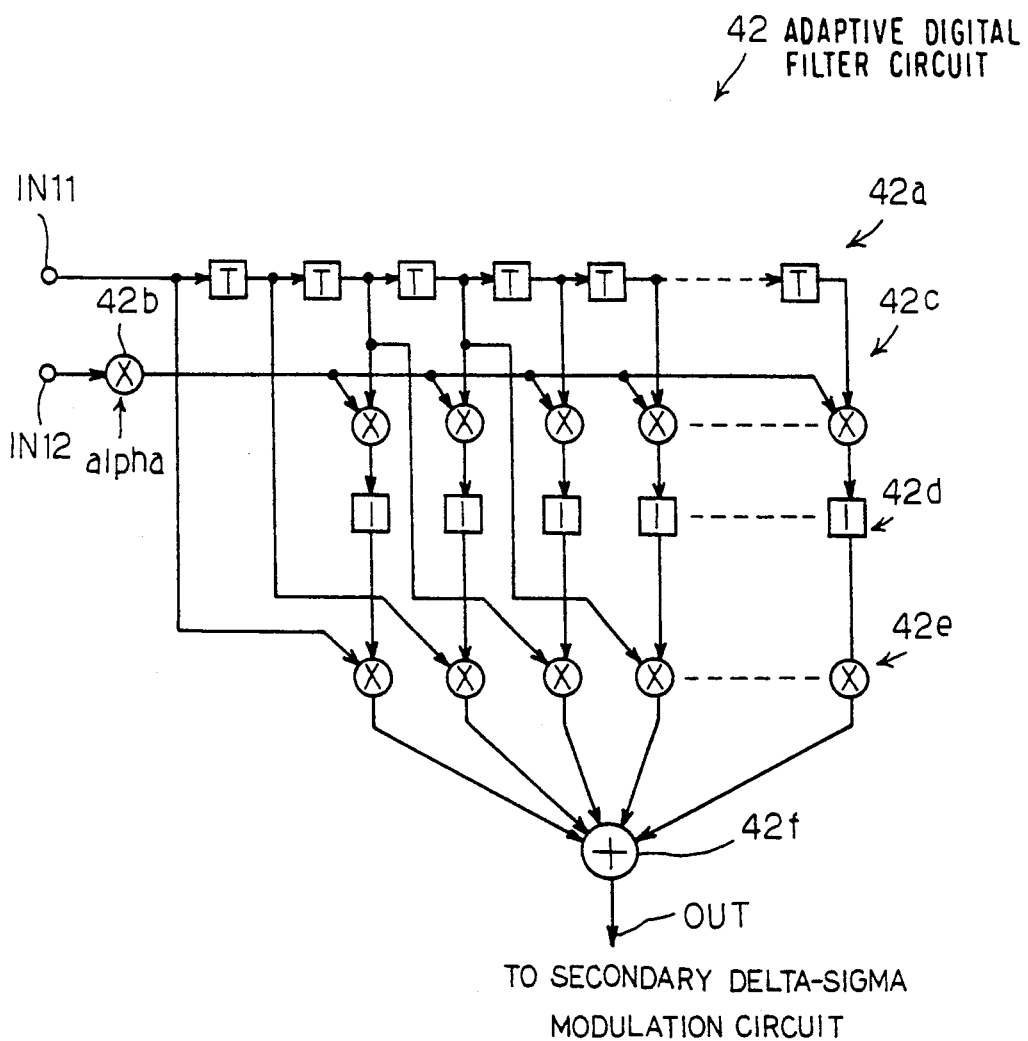
FIG. 4 is a block diagram showing the arrangement of an adaptive digital filter circuit incorporated in the transceiver shown in FIG. 3.

Turning to FIG. 4 of the drawings, the adaptive digital filter circuit 42 has two input ports IN11 and IN12 and a single output port OUT coupled to the second order delta-sigma modulation circuit 43. The transmit digital data signal TD is supplied to the input port IN11, and the other input port IN12 is coupled to the switching circuit 48. The input port IN11 is coupled to a series combination 42a of time delay circuits T, and each of the time delay circuits T introduces a unit delay to the transmit digital data signal TD. While the adaptive digital filter circuit 42 is in the training, the output signal without the echo signal is supplied to the input port IN12, and a multiplier 42b multiplies the output signal by the constant alpha. The product is supplied in parallel from the multiplier 42b to a first multiplier array 42c, and the multipliers X of the first array 42c respectively multiply the delayed digital signals fed from the second to last time delay units T by the product of the multiplier 42b. The products of the multipliers X of the array 42c are fed to integrator array 42d, and the integrals are multiplied at a second multiplier array 42e again. The transmit digital data signal TD and the delayed digital signals are supplied to the multipliers X of the second array 42e, and are multiplied by the integrals, respectively. The products of the second multiplier array 42e are totaled at an adder 42f, and the echo replica signal takes place at the output port of the adder 42f.

The adaptive digital filter circuit 42 is slightly modified from the adaptive digital filter circuit 14 of the prior art transceiver. Namely, the first multiplier array 42c to the second multiplier array 42e are offset from the series combination 42a of the time delay circuits T in the right direction of FIG. 4, and the transmit digital data signal TD is supplied to the second multiplier array 42e at later timings rather than the prior art adaptive digital filter circuit. This is because of the fact that the adder 45 is located at the previous stage of the second order delta-sigma converting circuit 46.

Figure 5:
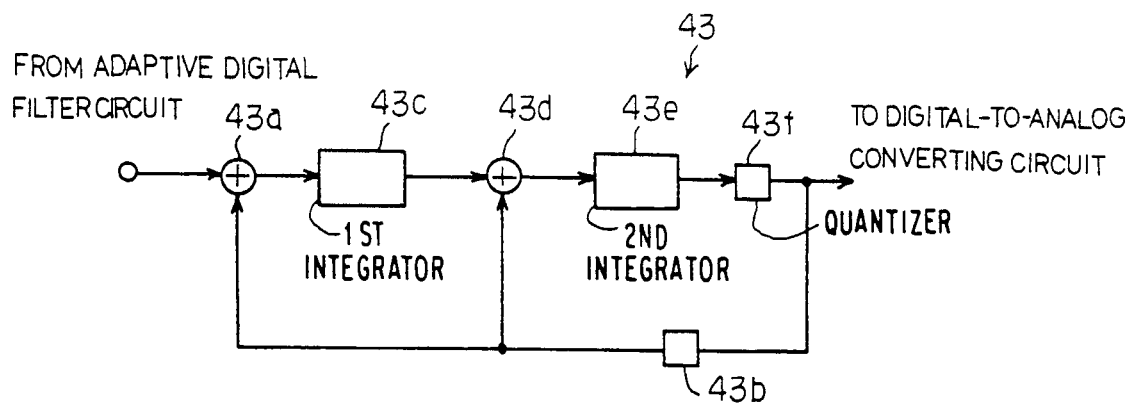
FIG. 5 is a block diagram showing the arrangement of a second order delta-sigma modulation circuit incorporated in the transceiver shown in FIG. 3.

Turning to FIG. 5, the second order delta-sigma modulation circuit 43 comprises a first adder 43a supplied with the echo replica signal and a feed-back signal from a time delay unit 43b, a first integrator 43c coupled to the first adder 43a, a second adder 43d coupled to the first integrator 43c and the time delay unit 43b, a second integrator 43e coupled to the second adder 43d, and a quantizer 43f coupled to the second integrator 43e. The single bit digital signal indicative of the echo replica signal takes place at the output port of the quantizer 43f, and is fed to the time delay unit 43b as well as the digital-to-analog converting circuit 44. The adders 43a and 43d, the integrators 43c and 43e, the quantizer 43f and the time delay unit 43b achieve the respective tasks at the over-sampling frequency.

Figure 6A:
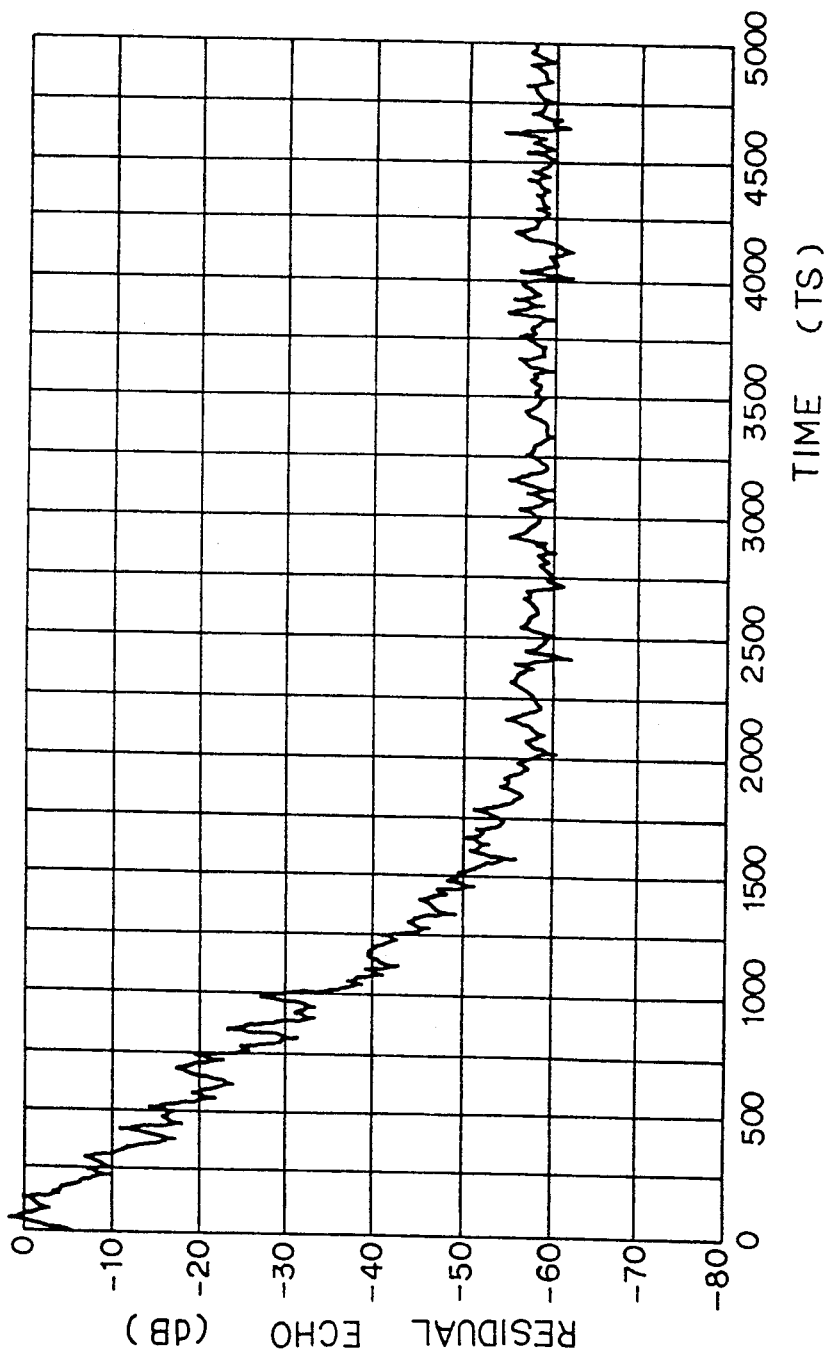
FIGS. 6A and 6B are graphs each showing residual echo in terms of time.
Figure 6B:
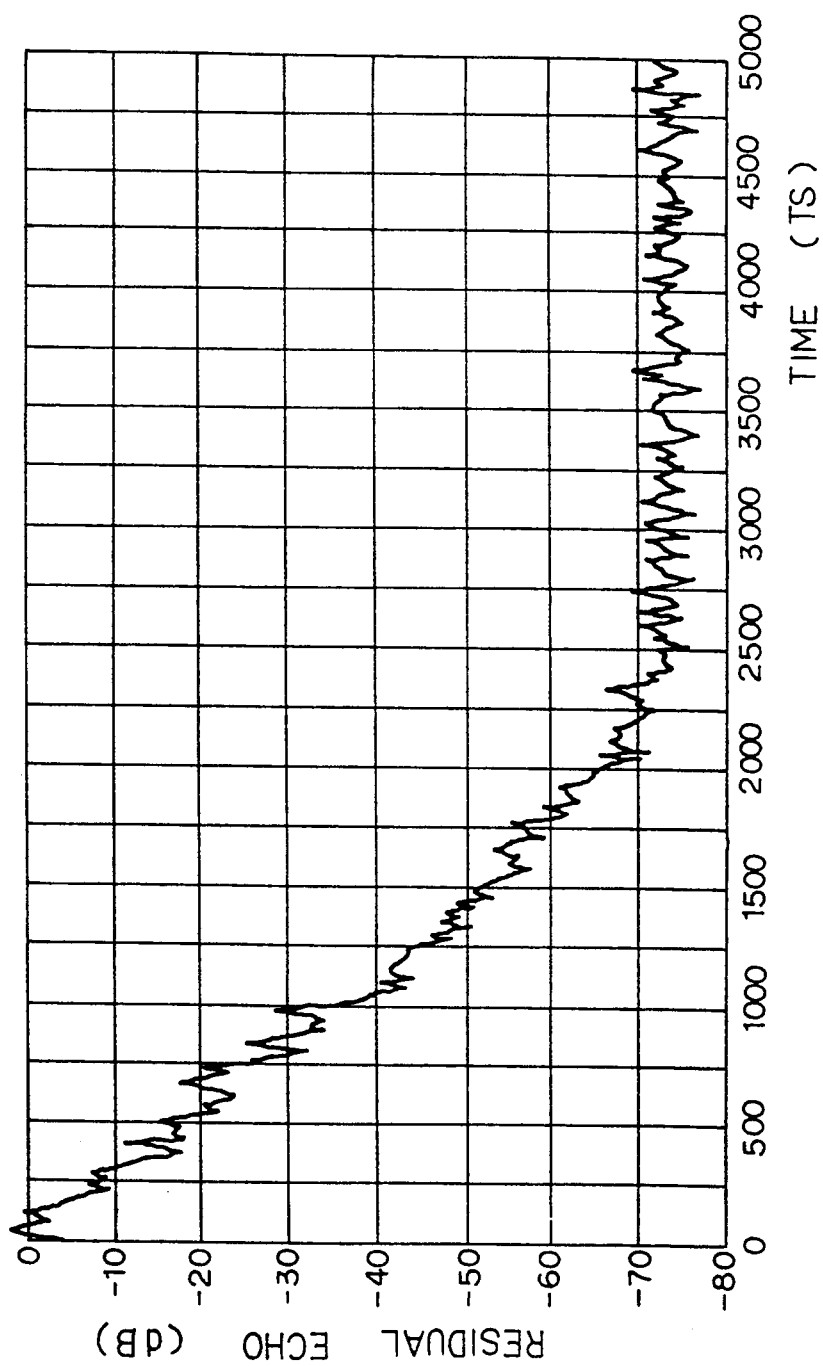

If analog-to-digital converting circuits both inferior in linearity are respectively incorporated in the prior art echo canceler and the echo canceler EC, residual echoes are left in the received digital signals. However, the echo canceler EC according to the present invention is less affectable by poor linearity of the analog-to-digital converting circuit 46. In order to confirm the advantage of the present invention, a simulation is carried out, and FIGS. 6A and 6B illustrate time dependency of the residual echoes simulated for the prior art echo canceler (FIG. 6A) and the echo canceler of the first embodiment (FIG. 6B). The analog-to-digital converting circuits 11 and 46 are modeled by applying 5% distortion to switched capacitor integrators incorporated in the analog-to-digital converting circuits 11 and 46. Comparing FIG. 6A with FIG. 6B, the residual echo of the first embodiment is decreased to less than $-70$ dB; however, the prior art echo canceler can decrease the residual echo around $-60$ dB. This means that the analog-to-digital converting circuit incorporated in the first embodiment is less affectable by poor linearity, and a relatively narrow dynamic range decreases the component circuit elements of the analog-to-digital converting circuit.

As will be understood from the foregoing description, the echo canceler according to the present invention eliminates the echo signal before the analog-to-digital conversion, and, for this reason, the digital circuits 46, 47 and 37 are less affectable by undesirable poor linearity. This results in a narrower dynamic range rather than the prior art echo canceler, and the circuit components are decreased.

Second Embodiment

Figure 7:
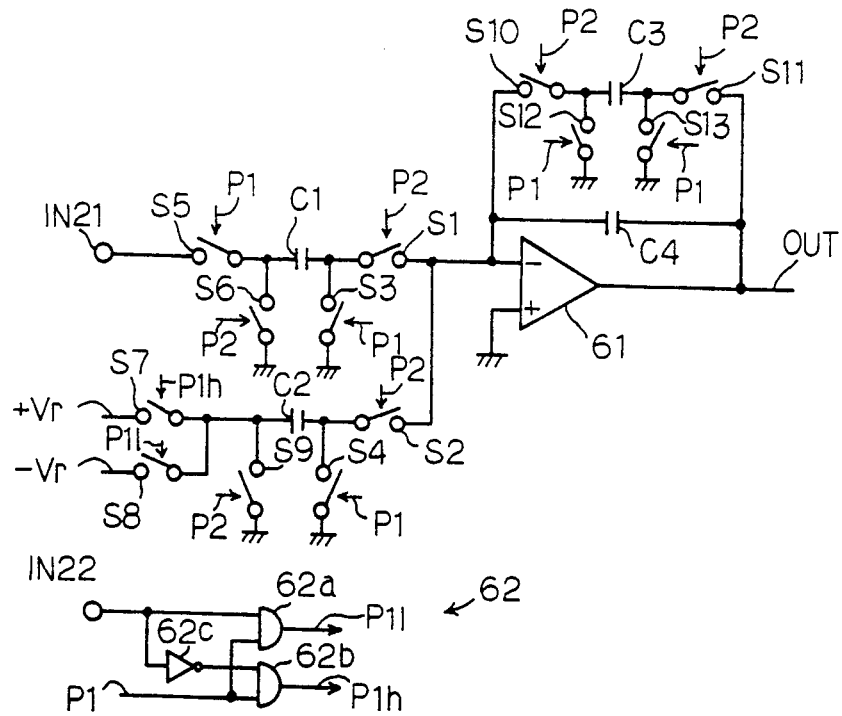
FIG. 7 is a circuit diagram showing the arrangement of a combined circuit of a digital-to-analog convertor and an adder incorporated in another transceiver according to the present invention.

Turning to FIG. 7 of the drawings, a combined circuit of a digital-to-analog converter and an adder is implemented by a switched capacitor filter. The digital-to-analog converter and the adder correspond to the digital-to-analog converting circuit 44 and the adder 45, respectively. The other component circuits of the second embodiment are similar to those of the first embodiment, and, for this reason, no further description on the other component circuits is incorporated hereinbelow.

The combined circuit comprises a single operation amplifier circuit 62, and the non-inverted input node of the operational amplifier circuit 61 is grounded. On the other hand, the inverted input node of the operational amplifier circuit 61 is coupled in parallel to capacitors C1 and C2 through respective switching elements S1 and S2, and the first electrodes of the capacitors C1 and C2 can be grounded through switching elements S3 and S4. The second electrode of the capacitor C1 is selectively coupled to an input node IN21 and a ground node through switching elements S5 and S6, and the second electrodes of the capacitor C2 is selectively coupled to a source of positive reference voltage $+Vr$, a source of negative reference voltage $-Vr$ and the ground node through switching elements S7, S8 and S9. Between the inverted input node and the output node of the operational amplifier circuit 61, capacitors C3 and C4 are coupled in parallel, and only the capacitor C3 is associated with switching elements S10, S11, S12 and S13. Namely, the capacitor C4 is directly coupled between the inverted node and the output node, however, the capacitor C3 is coupled through the switching elements S10 and S11. The capacitor C3 can be grounded through the switching elements S12 and S13.

The switching elements are shifted between on-state and off-state with first and second clock signals P1 and P2 as well as with auxiliary clock signals P1h and P1l of the first clock signal P1. The auxiliary clock signals P1h and P1l are produced by a clock generator 62 which comprises two AND gates 62a and 62b and an inverting circuit 62c. An input node IN22 is coupled to the AND gate 62a and the inverting circuit 62c, and the input nodes IN21 and IN22 are coupled to the low pass filter circuit 36 and the second order delta-sigma modulation circuit 43, respectively.

Figure 8:
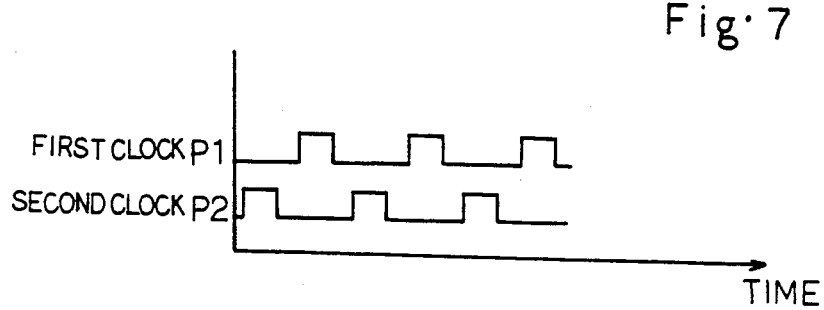
FIG. 8 is a diagram showing the waveforms of clock signals different in phase and used in the combined circuit shown in FIG. 7.

The waveforms of the first and second clock signals P1 and P2 are shown in FIG. 8, and the second clock signal P2 goes up to the high level while the first clock signal P1 remains low. The switching elements S1 to S13 are controlled with the clock signals P1, P2, P1h and P1l, and the capacitor C2, the switching elements S2, S4, S7, S8 and S9 and the clock generator 62 serves as a single bit digital-to-analog convertor. The combined circuit thus arranged achieves the digital-to-analog conversion and an adding operation. Since the digital-to-analog conversion and the adding operation is achieved with only one operational amplifier circuit 61, the circuit arrangement of the second embodiment is simpler rather than the first embodiment.

Figure 9:
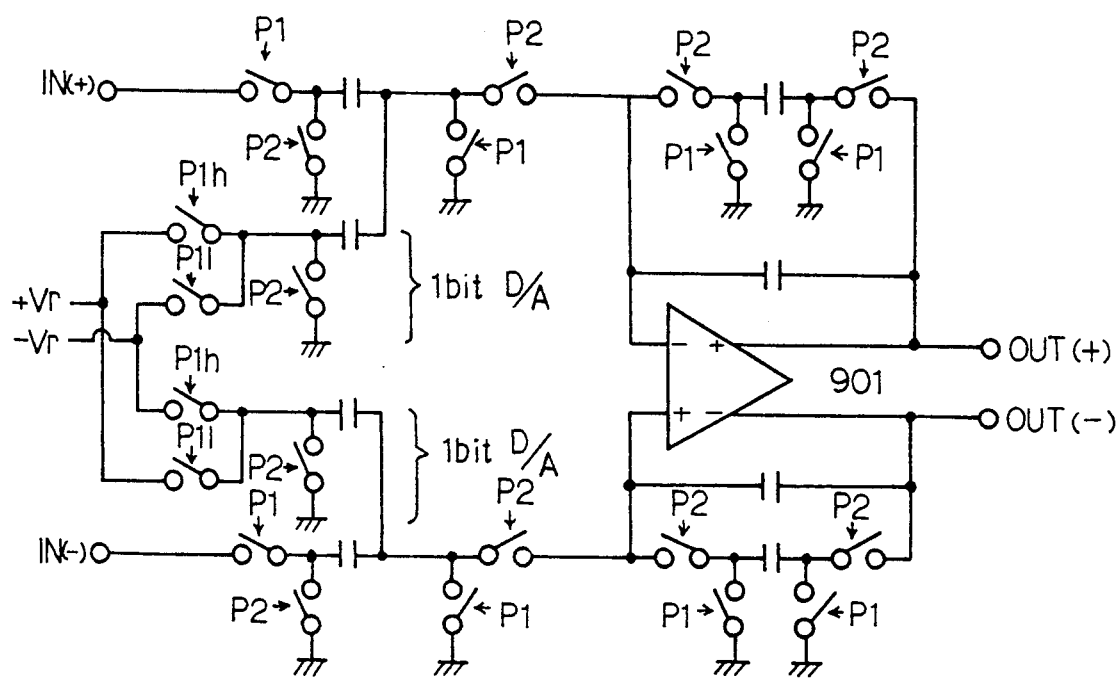
FIG. 9 is a circuit diagram showing the arrangement of a balance circuit according to the present invention.
Figure 9:
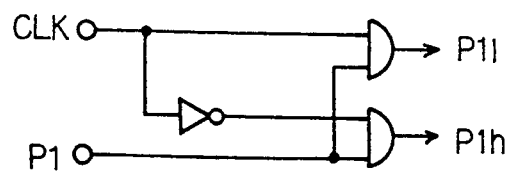

In the above mentioned circuit, the 1-bit digital-to-analog converting circuit and the adder is implemented by an unbalance switched capacitor circuit. However, if a fully differential operational amplifier is used, it is possible to fabricate a balance circuit. FIG. 9 shows an example of the balance circuit in which single bit digital-to-analog converting circuits and an adder are implemented by a fully differential switched capacitor circuit associated with a fully differential operational amplifier 901. P1 and P2 are clock signals different in phase, and controlling signals P1h and P1l are produced from the clock signal P1 and a system clock signal CLK. In this instance, a differential input IN(+) and IN(−) is supplied to the two 1-bit digital-to-analog converting circuits. The two 1-bit digital-to-analog converting circuits operate on the differential input IN(+) and IN(−), and carry out adding thereon. The balance circuit thus arranged is less sensitive to common mode noises.

Third Embodiment

Figure 10:
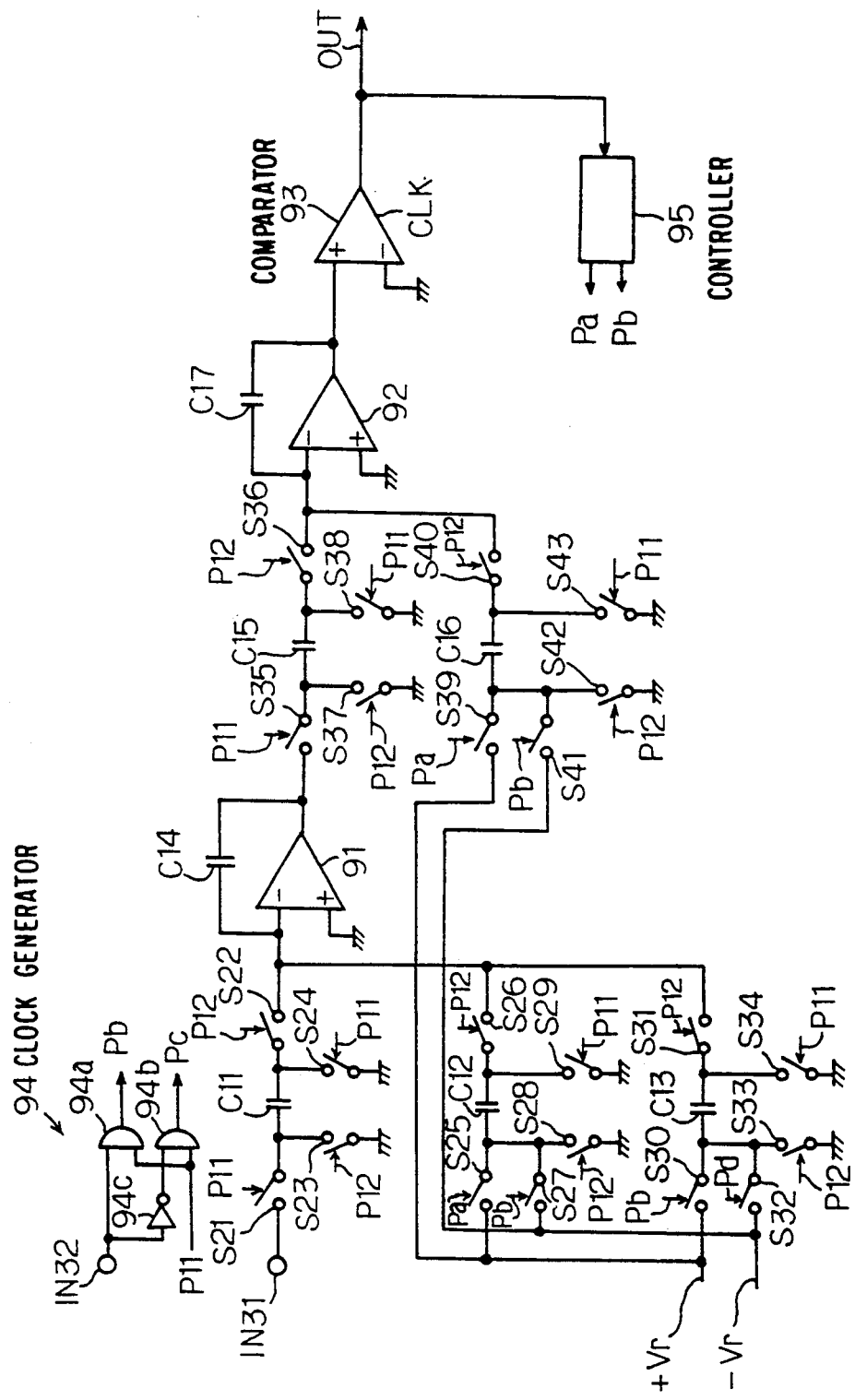
FIG. 10 is a circuit diagram showing the arrangement of another combined circuit of a digital-to-analog convertor and an adder incorporated in still another transceiver according to the present invention.

FIG. 10 illustrates another combined circuit of a digital-to-analog convertor and an adder incorporated in still another transceiver embodying the present invention. The component circuits of the first embodiment except for the digital-to-analog converting circuit 44 and the adder 45 are incorporated in the third embodiment, and the corresponding circuits are labeled with the same references.

The combined circuit comprises two operational amplifier circuits 91 and 92 associated with capacitors C11 to C17 which in turn are associated with switching elements S21 to S43. The non-inverted input nodes of the operational amplifier circuits 91 and 92 are grounded, and the output node of the operational amplifier circuit 92 is coupled to a comparator 93. The capacitors C14 and C17 are directly coupled between the output node and the inverted input node of the operational amplifier circuit 91 and between the output node and the inverted input node of the operational amplifier circuit 92, respectively, and the other capacitors are selectively coupled to an input node IN31, a source of positive reference voltage +Vr, a source of negative reference voltage −Vr, the operational amplifier circuits 91 and 92 and a ground node.

The combined circuit further comprises a clock generator 94 for producing auxiliary clock signals Pc and Pd, and a controller 95 coupled to the output node of the comparator 93 for producing other auxiliary clock signals Pa and Pb. The clock generator 94 comprises tow AND gates 94a and 94b and an inverting circuit 94c, and an input node IN32 is coupled to the AND gate 94a and the inverting circuit 94c. The input nodes IN31 and IN32 are coupled to the low pass filter circuit 36 and the second order delta-sigma modulation circuit 43, respectively.

Figure 11:
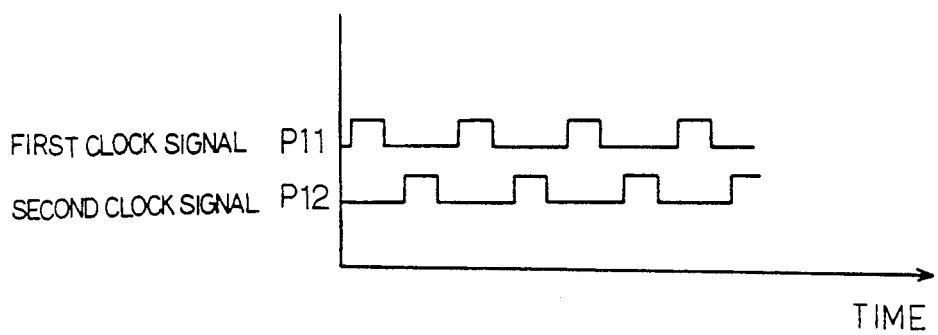
FIG. 11 is a diagram showing the waveforms of clock signals different in phase from each other and used in the combined circuit shown in FIG. 10.

The waveforms of first and second clock signals P11 and P12 are shown in FIG. 11, and the second clock signal P12 goes up to the high level while the first clock signal P11 remains low. For this reason, the switching elements such as S21 and S23 alternatively turn on and off, and the combined circuit is of the type having the second order delta-sigma analog-to-digital converting circuit 46 and further achieving functions of a digital-to-analog convertor and an adder. The switching elements S30 to S34 and the capacitor C13 serves as a single bit digital-to-analog convertor, and the first integrator of the second order delta-sigma analog-to-digital converting circuit 46 achieves the adding operation. Thus, the combined circuit shown in FIG. 10 deletes operational amplifier circuits from the digital-to-analog converting circuit 44 and the adder 45, and, for this reason, the component elements are minimized.

Figure 12:
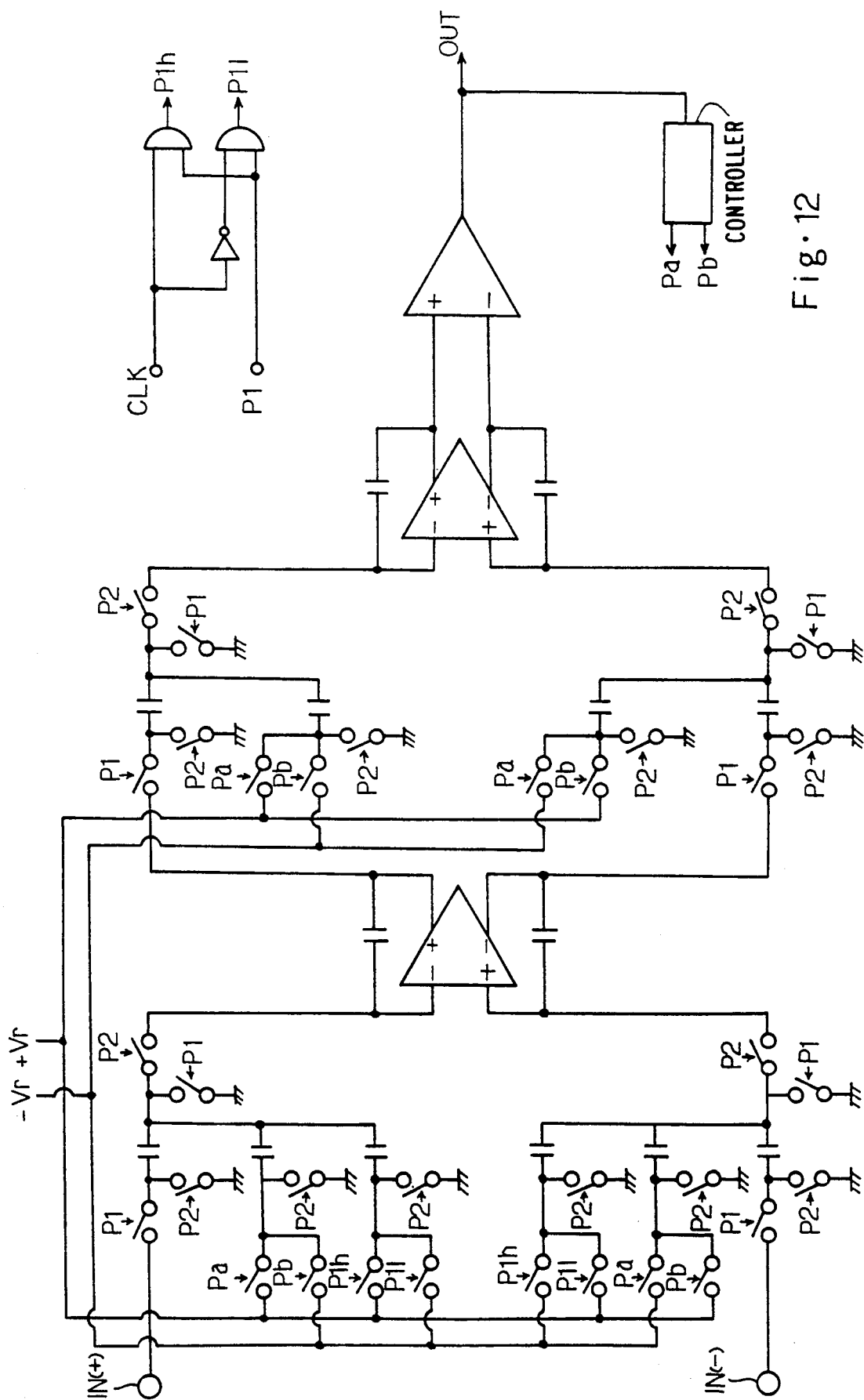
FIG. 12 is a circuit diagram showing the arrangement of a balance circuit according to the present invention.

In the above described circuit, the 1-bit digital-to-analog converting circuit, the adder and the second order delta-sigma modulator are implemented by an unbalance switched capacitor circuit. However, it is possible to fabricate a balance circuit as similar to the second embodiment. Namely, FIG. 12 shows the circuit arrangement of a balance circuit where a fully differential second order delta-sigma modulator is coupled to a differential digital-to-analog converting circuit. This balance circuit is less sensitive to common mode noises as similar to the balance circuit shown in FIG. 9.

Fourth Embodiment

Figure 13:
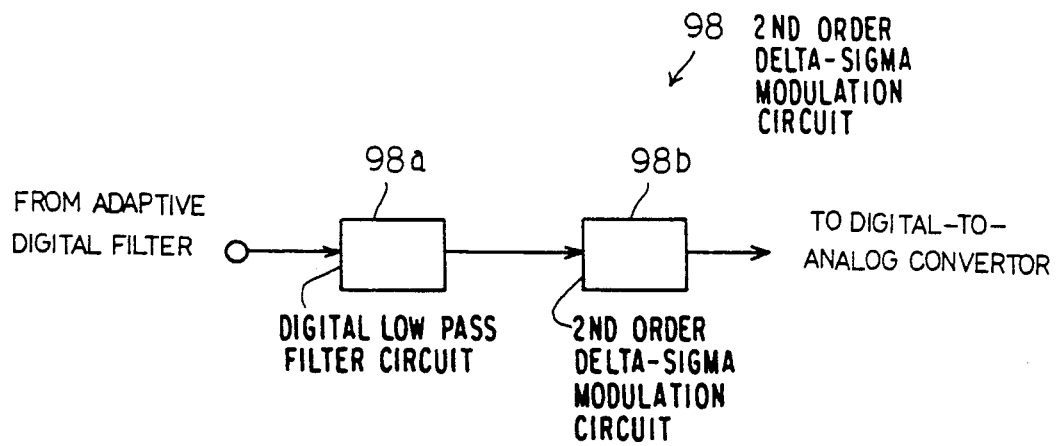
FIG. 13 is a block diagram showing the arrangement of another second order delta-sigma modulation circuit incorporated in still another transceiver according to the present invention.

FIG. 13 shows the arrangement of another second order delta-sigma modulation 98 circuit incorporated in still another transceiver embodying the present invention. However, the other component circuits are similar to those of the first embodiment, and detailed description is focused upon the second order delta-sigma modulation circuit 98 only. The second order delta-sigma modulation circuit 98 comprises a digital low pass filter circuit 98a and a second order delta-sigma modulation circuit similar to that of the first embodiment. The digital low pass filter circuit 98a is operative at the over-sampling frequency, and carries out an interpolation on the echo replica signal at the baud rate frequency fed from the adaptive digital filter circuit 42. With the digital low pass filter, the echo canceler is improved in the echo restriction characteristics between the sampling points at the baud rate frequency.

Figure 14A:
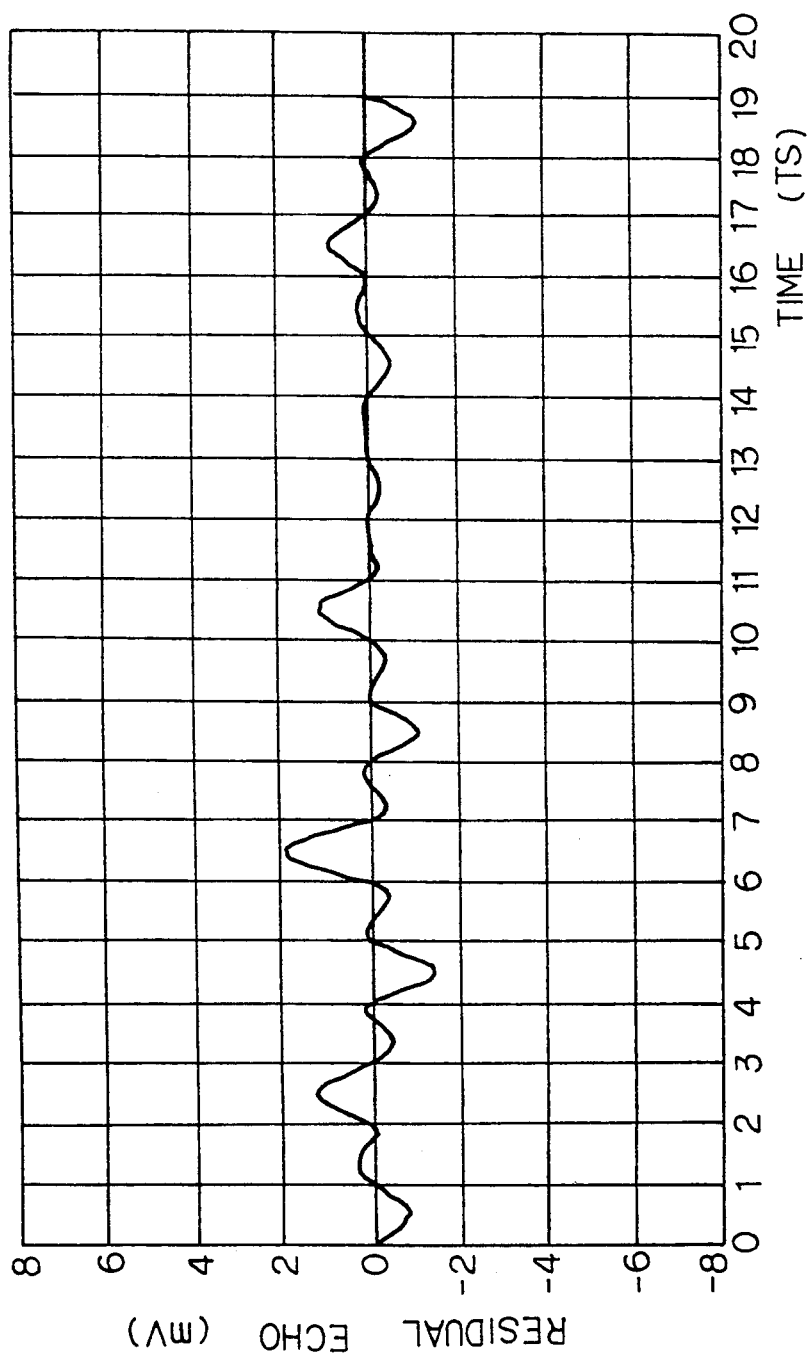
FIGS. 14A and 14B are graphs each showing residual echo in terms of time.
Figure 14B:
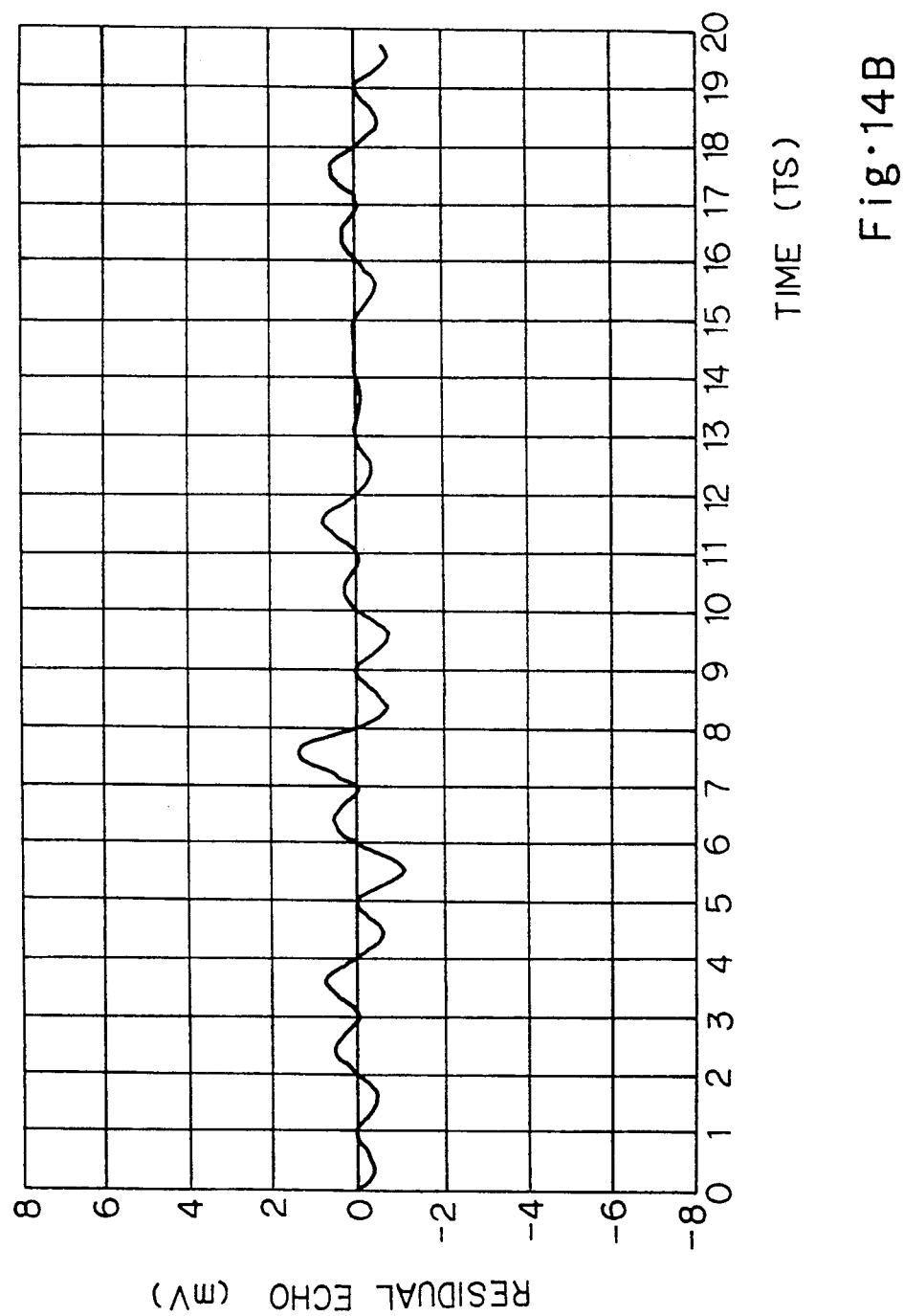

In detail, FIGS. 14A and 14B shows residual echoes in the received digital signals produced by the first embodiment (FIG. 14A) and the fourth embodiment (FIG. 14B) upon completion of training. The digital low pass filter circuit 98a is implemented by an FIR filter with 96 taps. The vertical strips of FIGS. 14A and 14B are matched with the sampling points at the baud rate frequency, and the echo cancelers according to the present invention decrease residual echo to about zero at the sampling points. However, the residual echo between the sampling points depends on the interpolation characteristics. Comparing FIG. 14A with FIG. 14B, the fourth embodiment restricts the residual echo between the sampling points rather than the first embodiment. Thus, the fourth embodiment is improved in the interpolation characteristics by virtue of the digital low pass filter circuit, and can restrict the residual echo due to phase shift of received clock signal. This results in improvement in timing extraction.

Although particular embodiments of the present invention have been shown and described, it will be obvious to those skilled in the art that various changes and modifications may be made without departing from the spirit and scope of the present invention.

What is claimed is:

1. An echo canceler associated with a signal transmission unit for transmitting a transmit digital signal and operative to eliminate an echo signal from a received analog signal containing at least said echo signal and a far-end signal, comprising:
   a) an adaptive digital filter circuit supplied with said transmit digital signal and a first digital signal without said echo signal so as to see a correlation therebetween, and operative to produce a digital echo replica signal;
   b) a delta-sigma modulation circuit operative to carry out a delta-sigma modulation on said digital echo replica signal and producing a second digital signal representative of said digital echo replica signal;
   c) a digital-to-analog converting circuit for converting said second digital signal to a first analog signal;
   d) a first adder supplied with said received analog signal and said first analog signal, and operative to eliminate said echo signal from said received analog signal for producing a received analog signal without said echo signal; and
   e) means operative to carry out a delta-sigma analog-to-digital converting operation on said received analog signal without said echo signal, and producing said first digital signal.

2. An echo canceler as set forth in claim 1, in which said delta-sigma modulation circuit is of a second order type, and in which said digital echo replica signal is sampled at an over-sampling frequency n times larger than a baud rate of said transmit digital signal where n is an integer.

3. An echo canceler as set forth in claim 2, in which said means comprises e-1) a second order delta-sigma analog-to-digital converting circuit coupled with said first adder, and supplied with said receive analog signal without said echo signal for producing a third digital signal, and e-2) a digital low pass filter circuit coupled with said second order delta-sigma analog-to-digital converting circuit, and operative to eliminate noises and to decimate said third digital signal for changing the frequency thereof from said over-sampling frequency to said baud rate thereby producing said first digital signal.

4. An echo canceler associated with a signal transmission unit for transmitting a transmit digital signal and operative to eliminate an echo signal form a received analog signal containing at least said echo signal and a far-end signal, comprising:
 a) an adaptive digital filter circuit supplied with said transmit digital signal and a first digital signal without said echo signal so as to see a correlation therebetween, and operative to produce a digital echo replica signal sampled at an over-sampling frequency n times larger than a baud rate of said transmit digital signal where n is an integer;
 b) a delta-sigma modulation circuit of a second order type operative to carry out a delta-sigma modulation on said digital echo replica signal and producing a second digital signal representative of said digital echo replica signal;
 c) a digital-to-analog converting circuit for converting said second digital signal to a first analog signal;
 d) a first adder supplied with said received analog signal and said first analog signal, and operative to eliminate said echo signal from said received analog signal for producing a received analog signal without said echo signal;
 e) means operative to carry out a delta-sigma analog-to-digital converting operation on said received analog signal without said echo signal, and producing said first digital signal, said means comprising e-1) a second order delta-sigma analog-to-digital converting circuit coupled with said first adder, and supplied with said received analog signal without said echo signal for producing a third digital signal, and e-2) a digital low pass filter circuit coupled with said second order delta-sigma analog-to-digital converting circuit, and operative to eliminate noises and to decimate said third digital signal for changing the frequency thereof from said over-sampling frequency to said baud rate, thereby producing said first digital signal; and
 f) an equalizer coupled to said digital low pass filter circuit and eliminating a distortion therefrom for producing a received digital signal representative of said far-end signal, and
 g) a switching circuit selectively coupling said digital low pass filter circuit and said equalizer to said adaptive digital filter circuit.

5. An echo canceler as set forth in claim 4, in which said adaptive digital filter circuit comprises a-1) a series combination of first time delay circuits each introducing a unit time delay into propagation of said transmit digital signal, thereby producing a series of delay signals, a-2) a first multiplier for multiplying said first digital signal by a constant which is a coefficient for controlling a training speed, thereby producing a first product, a-3) a plurality of second multipliers for multiplying later delay signals selected from said delay signals by said first product, respectively, thereby producing respective second products, a-4) a plurality of first integrators respectively coupled with said second multipliers and producing respective first integrals, a-5) a plurality of third multipliers for multiplying said transmit digital signal and said delay signals by said first integrals, respectively, thereby producing respective third products, a-6) a second adder for adding said third products to one another for producing said digital echo replica signal.

6. An echo canceler as set forth in claim 4, in which said delta-sigma modulation circuit comprises b-1) a second adder supplied with said digital echo replica signal and a delayed second digital signal, b-2) a second integrator coupled to said second adder for producing a second integral, b-3) a third adder supplied with said second integral and said delayed second digital signal, b-4) a third integrator coupled to said third adder, b-5) a quantizer coupled to said third integrator for producing said second digital signal, and b-6) a second time delay circuit supplied with said second digital signal for producing said delayed second digital signal.

7. An echo canceler as set forth in claim 4, in which said transmission unit drives a transformer coupled to a two-wire signal path, and in which a balancing circuit is coupled to said transformer for supplying said received analog signal through a low pass filter circuit to said first adder.

8. An echo canceler as set forth in claim 4, in which said digital-to-analog converting circuit and said first adder are implemented by a first combined circuit comprising h-1) a first operational amplifier circuit having a non-inverted input node coupled to a ground voltage source, h-2) a series combination of a first switching element, a first capacitor and a second switching element coupled to an inverted input node of said first operational amplifier circuit and supplied with said received analog signal, h-3) third and fourth switching elements coupled between the electrodes of said first capacitor and the ground voltage source, h-4) a series combination of a fifth switching element, a second capacitor and a sixth switching element coupled between a source of positive reference voltage and said inverted input node of said first operational amplifier circuit, h-5) a seventh switching element coupled between a source of negative reference voltage and said second capacitor, h-6) eighth and ninth switching elements coupled between electrodes of said second capacitor and the ground voltage source, h-7) a third capacitor coupled between the inverted input node and an output node of said first operational amplifier circuit, h-8) a series combination of a tenth switching element, a fourth capacitor and an eleventh switching element coupled in parallel to said third capacitor, h-9) twelfth and thirteenth switching elements coupled between electrodes of said fourth capacitor and the ground voltage source, and h-10) a first clock generator having a first input node coupled to said delta-sigma modulation circuit and a second input node supplied with a first clock signal for producing first and second auxiliary clock signals different in phase, said first to thirteenth switching elements selectively turning on and off with said first clock signal, a second clocks signal different in phase from said first clock signal and said first and second auxiliary clock signals.

9. An echo canceler as set forth in claim 4, in which said digital-to-analog converting circuit, said first adder and said second order delta-sigma analog-to-digital converting circuit are implemented by a second combined circuit comprising i-1) a second operational amplifier circuit having a non-inverted input node coupled to a ground voltage source, i-2) a series combination of a fourteenth switching element, a fifth capacitor and a fifteenth switching element coupled to an inverted node of said second operation amplifier circuit and supplied with said received analog signal, i-3) sixteenth and seventeenth switching elements coupled between electrodes of said fifth capacitor and said ground voltage source, i-4) a series combination of an eighteenth switching element, a sixth capacitor and nineteenth switching element coupled between a source of positive reference voltage and said inverted input node of said second operational amplifier circuit, i-5) twentieth and twenty-first switching element coupled between electrodes of said sixth capacitor and said ground voltage source, i-6) a twenty-second switching element coupled between a source of negative reference voltage and said sixth capacitor, i-7) a series combination of twenty-third switching element, a seventh capacitor and twenty-fourth switching element coupled between said source of positive reference voltage and the inverted input node of said second operational amplifier circuit, i-8) a twenty-fifth switching element coupled between said source of negative reference voltage and said seventh capacitor, i-9) twenty-sixth and twenty-seventh switching elements coupled between electrodes of said seventh capacitor and said ground voltage source, i-10) an eighth capacitor coupled between the inverted input node and an output node of said second operational amplifier circuit, i-11) a third operational amplifier circuit having a non-inverted input node coupled to said ground source, i-12) a series combination of a twenty-eighth switching element, a ninth capacitor and a twenty-ninth switching element coupled between the output node of said second operational amplifier circuit and an inverted input node of said third operational amplifier circuit, i-13) thirtieth and thirty-first switching elements coupled between electrodes of said ninth capacitor and said ground voltage source, i-14) a series combination of thirty-second switching element, a tenth capacitor and a third-third switching element coupled between said source of positive reference voltage and the inverted input node of said third operational amplifier circuit i-15) a thirty-fourth switching element coupled between said source of negative reference voltage and said tenth capacitor, i-16) thirty-fifth and thirty-sixth switching elements coupled between electrodes of said tenth capacitor and said ground voltage source, i-17) an eleventh capacitor coupled between the inverted input node and an output node of said third operational amplifier circuit, i-18) a comparator having input nodes coupled to the output node of said third operational amplifier circuit and said ground voltage source, i-19) a controller coupled to the output node of said comparator for producing first and second timing signals, and i-20) a second controller having two input nodes respectively supplied with said received analog signal and a first clock signal for producing first and second auxiliary clock signals different in phase, said fourteenth to thirty-sixth switching elements selectively turning on and off with said first clock signal, a second clock signal different in phase from said first clocks signal, said first and second timing signals and said first and second auxiliary clock signals.

10. An echo canceler as set forth in claim 4, in which said delta-sigma modulation circuit comprises j-1) a digital low pass filter for carrying out an interpolation on said digital echo replica signal, and j-2) a second order delta-sigma modulator coupled to said digital low pass filter for producing said second digital signal.

* * * * *